United States Patent [19]

Roth et al.

[11] Patent Number: 4,856,911
[45] Date of Patent: Aug. 15, 1989

[54] METHOD AND DEVICES FOR MEASURING THE TEMPERATURE OF A RUNNING FILIFORM ELEMENT

[75] Inventors: Bernard M. Roth, Boulogne Billancourt; Daniel R. M. Neveu, Sur Marne; Catherine Delikat, Paris, all of France

[73] Assignee: Bertin & Cie, Cedex, France

[21] Appl. No.: 115,611

[22] PCT Filed: Jun. 13, 1985

[86] PCT No.: PCT/FR85/00149

§ 371 Date: Feb. 14, 1986

§ 102(e) Date: Feb. 14, 1986

[87] PCT Pub. No.: WO86/00132

PCT Pub. Date: Jan. 3, 1986

Related U.S. Application Data

[63] Continuation of Ser. No. 848,044, Feb. 14, 1986, abandoned.

[30] Foreign Application Priority Data

Jun. 5, 1984 [FR] France .................................. 84 09369

[51] Int. Cl.⁴ ...................... G01K 11/00; G01K 13/06
[52] U.S. Cl. ..................................... 374/135; 374/153; 374/148
[58] Field of Search ............... 374/153, 120, 133, 147, 374/148; 73/207, 861.04, 153; 165/34

[56] References Cited

U.S. PATENT DOCUMENTS

| | | | |
|---|---|---|---|
| 2,204,797 | 6/1940 | Fearn | 374/120 X |
| 3,604,263 | 9/1971 | Neuilly | 73/204 |
| 3,776,039 | 12/1973 | Bowen | 374/147 |
| 4,191,052 | 3/1980 | Drzewiecki | 374/135 |
| 4,430,010 | 2/1984 | Brenner et al. | 374/135 X |
| 4,501,504 | 2/1985 | Urmenyi et al. | 374/120 X |
| 4,595,299 | 6/1986 | Lindwall et al. | 374/153 |

FOREIGN PATENT DOCUMENTS

| | | |
|---|---|---|
| 0815856 | 10/1951 | Fed. Rep. of Germany . |
| 3220087 | 12/1983 | Fed. Rep. of Germany . |
| 3233863 | 3/1984 | Fed. Rep. of Germany . |
| 1552793 | 9/1979 | United Kingdom . |

*Primary Examiner*—Daniel M. Yasich
*Attorney, Agent, or Firm*—A. W. Breiner

[57] ABSTRACT

Method of measuring the temperature of a running filiform element, without mechanical contact with the element, and devices for implementing such method. According to the invention, a fluid of which the temperature and the flow rate have been measured is supplied to a chamber through which a filiform element is moving. Part of the fluid is collected in order to measure its temperature. The temperature of the element is determined from the flow rate and injection exit temperatures of the fluid. The invention is particularly applied in metallurgy to temperature measuring of yarns, tubes, sheets or metal strips, sections, and the like.

5 Claims, 1 Drawing Sheet

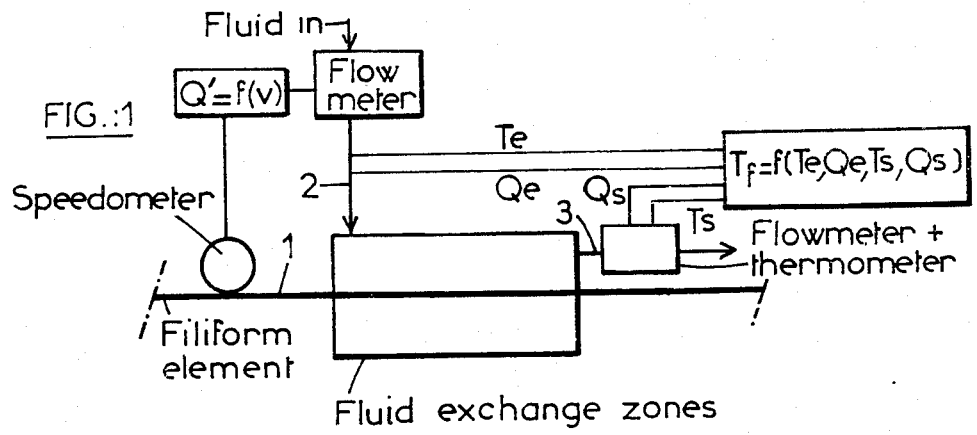
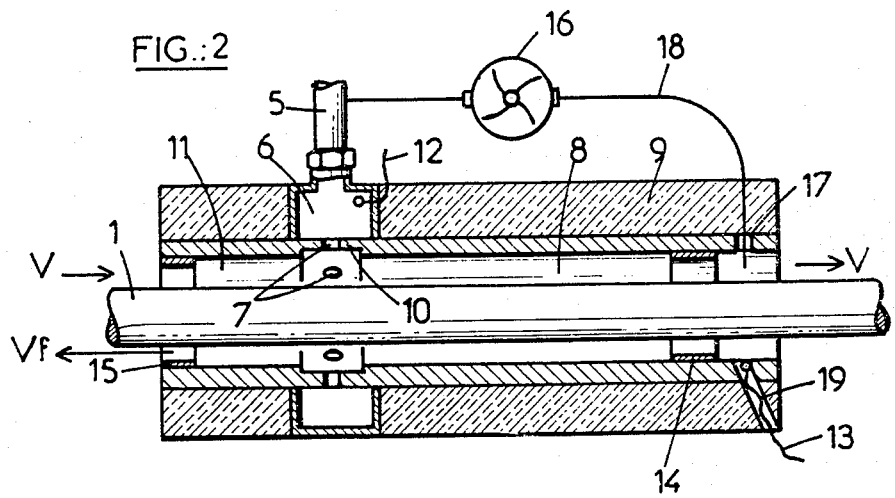
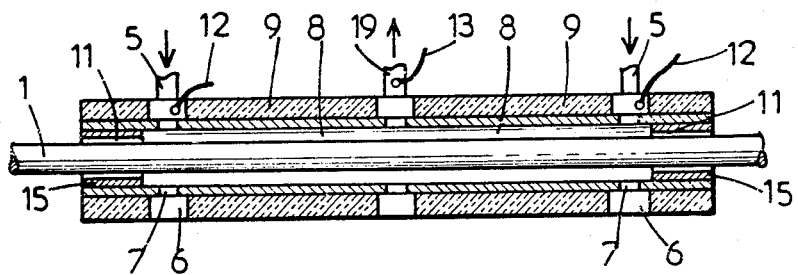

METHOD AND DEVICES FOR MEASURING THE TEMPERATURE OF A RUNNING FILIFORM ELEMENT

This application is a continuation of application Ser. No. 848,044, filed 2/14/86, now abandoned.

The present invention relates to a method for measuring the temperature of a running filiform element,—without mechanical contact with the element, and to devices applying the method.

The term "filiform element" will be used hereinafter to denote any elongate body, such as a metallurgical wire, a tube having a circular or polygonal section, a metal strip or band, sections, etc. in continuous or discontinuous movement.

The continuous follow-up of production processes frequently requires a good knowledge of the temperature of the products moving past.

Measurement of the temperature of a wire leaving a draw die or of a strip leaving a rolling mill can be made by contact with a thermocouple or by heat conduction means intended to come into contact with the surface of the element. This technique is possible only if the product moves past slowly, while in addition the validity of the measurement is dependent on the quality of the contact.

Use is also made of infrared thermometers or radiothermometers, which are inaccurate in use on the one hand because the emissivity of the wire is not known and will vary, and on the other hand because of the difficulty of sighting with a wire of small diameter in a clean environment. In the medium temperature ($T \leq 700°$ C.) and/or low emissivity range their use is not reliable.

Temperature measurement in accordance with the invention makes it possible to eliminate the disadvantage of making contact between the detection means and the element. It is also insensitive to the thermooptical characteristics of the element and to its surface state. The range of temperatures measured is extended by from 50° to more than 500° C. with an accuracy of the order of ±5% and with low inertia because the response time is short.

The process according to the invention permits measurement during movement without disturbing the wire. It is simple to apply, and therefore easy to carry out, inexpensive and highly reliable.

According to the invention a fluid, whose temperature and flow have been measured, is delivered onto the moving filiform element, a part of the fluid is collected in order to measure its temperature, the results are analyzed, and the temperature of the element is deduced by comparison with a standardized scale.

The fluid is preferably delivered in such a manner that it impinges by impact with the element, whereupon it is conducted along a portion of the element.

The invention relates generally to any device having a chamber through which the element passes, a fluid injection device delivering the fluid into the chamber and around the element, and means for measuring the temperature and flow of the fluid before and then after its passage through the chamber, in order to deduce therefrom the temperature of the element after analysis of these temperatures and comparison with a standardized scale.

The chamber will be provided with thermal insulation and its mass reduced to the minimum in order to lessen losses of fluid and to shorten the response time of the measurement system.

As an alternative, a part of the fluid escaping from the chamber may be recycled by a recuperation device (suction and acceleration by fan or ejector). The fluid injected may also be subjected to previous thermal regulation. Thus, for certain applications, it may be advantageous for the injected fluid to be substantially at the temperature of the outgoing fluid.

The following description, given by way of example, will make it clear how the invention can be applied.

FIG. 1 is a schematic view illustrating the process according to the invention.

FIG. 2 is a view in longitudinal section of a device for measuring the temperature of a filiform element.

FIG. 3 is a view in longitudinal section of an alternative form of construction of the device shown in FIG. 2.

Referring to FIG. 1, the measurement process for a filiform element, which in this particular case is a wire 1, comprises the ejection around this wire of a fluid (arrow 2), for example air, with a determined rate of flow Q, the temperature Te of which fluid is measured, for example with a thermocouple. A part of this fluid (arrow 3) is collected after it has been in contact with the wire, and its temperature Ts is measured, for example with a second thermocouple. The temperature Tf of the wire being dependent on the incoming temperature Te, the outgoing temperature Ts, and the rate of flow Q, for a given flow it is sufficient to take the temperatures Te and Ts and to establish the relationship $Tf = f(Te, Ts)$ to determine the temperature of the wire, which can be done by programming a microprocessor.

The better the heat exchange between the fluid and the wire, the more efficient the process will be.

FIG. 2 illustrates one form of construction of a device for measuring the temperature of a wire without contact, which is highly effective because of the use of very efficient convective heat exchange.

For this purpose two exchange zones are formed: a first localized exchange zone based on impact, that is to say collision between the air and the wire, followed by a second, longitudinal exchange zone along a part of the wire, based on bathing.

The first exchange zone comprises an air supply pipe 5 leading into an annular chamber 6 surrounding the wire and communicating with the peripheral space around the wire through apertures 7, which may optionally be equipped with nozzles (not shown), disposed in the annular wall 10 opposite the wire 1 and delivering jets of air directed perpendicularly to the wire.

This first exchange zone is extended in the direction of movement of the wire by a second zone comprising an annular duct 8 surrounding the wire 1 in its immediate proximity and directing the air coming from the nozzles along the wire (this duct is provided with thermal insulation 9). The first exchange zone may also be extended upstream by an annular duct 11 allowing adjustment of the positive pressure in the zone of the jets but having a shorter length than the duct 8.

The nominal air flow is selected to be as low as possible, while however respecting a minimum flow which gives the air a speed higher than the speed of entrainment of ambient air by the wire. The ambient air flow entrained into the device is then negligible in relation to the measurement flow.

The temperature of the air is measured at two points: upstream, in the annular chamber 6 by a thermocouple schematically indicated at 12, downstream, in the annular duct 8 or in a sampling duct 19 near the end aperture, by means of a thermocouple schematically indicated at 13.

In order that the measurement of temperature made at the outlet by the thermocouple 13 may be representative of the mixed air temperature in the annular duct, one of the following devices will be installed for the most delicate measurement configurations (laminar flow conditions):

arrangement of a flow disturber ring 14 in the duct 8 upstream of the measurement point 13, to effect agitation and homogenization of the flow;

connection in opposition of two exchange chambers in accordance with the arrangement schematically shown in FIG. 3, the use in common, in the central mixing zone, of a sampling duct 19, in which the outgoing temperature is measured at 13.

A ring 15 will be disposed in the duct 11 in order to adjust a sufficiently high positive pressure in the duct 8 in such a manner as to limit the entrainment of ambient air by the wire and to ensure a substantial measurement flow in the duct 19.

The first exchange zone will preferably be dimensioned so as to respect the following conditions:

$$\frac{h}{Dj} \geqq 4 \text{ and } \frac{Dc}{Nj\, Dj} \leqq 2$$

h being the distance between the apertures 7 and the surface of the wire 1,

Dj the diameter of the apertures 7,

Dc the diameter of the annular wall 10 provided with the apertures 7,

Nj the number of apertures.

Similarly, the second exchange zone will be dimensioned in such a manner that:

the length l of the duct 8 will be maximum, the ratio of the inside diameter of the duct 8 to the diameter of the wire will be minimum, the thickness of the duct 8 and its conductivity will be minimal.

In a modified embodiment it is possible to increase the apparent efficiency of the exchanger by recirculating a part of the flow, either with the aid of an ejector having a low dilution rate or with the aid of a fan 16 collecting the fluid through apertures 17 and conducting it to the pipe 5 with the aid of appropriate means 18 (see FIG. 2).

The standardization scale can be restricted to a balance of losses by preheating the air injected, in such a manner that the outgoing fluid temperature will be nominally equal to the incoming temperature. It will thus be possible to consider that the outgoing fluid temperature is equal to the temperature of the wire, except for losses of air in the measuring chamber.

We claim:

1. Method for measuring the temperature of a running filiform element with measuring means without mechanical contact being made between said measuring means and said element comprising the steps of (a) passing a filiform element through a first exchange zone while a delivered gas at a measured flow rate is caused to impinge upon and all around said filiform element, and wherein a delivered gas flow in said first zone is selected to be as low as possible while maintaining a minimum flow to provide said gas with a speed higher than the speed of entrainment of ambient gas by the filiform element, and measuring the temperature of the delivered gas; (b) passing said filiform element from said first zone through a second longitudinal exchange zone wherein said filiform element is bathed in said gas, and measuring the temperature of said gas near an extremity of said second zone opposed to said first exchange zone; and (c) determining the temperature of the filiform element from a relationship between the temperature of the delivered gas in the first zone, the temperature of the gas near the extremity of the second zone and the rate of flow of the delivered gas.

2. A device for measuring the temperature of a moving filiform element without mechanical contact with said element, comprising:

an elongated, thermally insulated, body encompassing a longitudinal portion of said element for defining around the same an open-ended annular duct including at least two longitudinally adjacent heat-exchange zones;

means for injecting a fluid into a first one of said exchange zones to form a plurality of fluid jets impinging substantially radially onto the whole periphery of said element;

means for measuring respectively flow rate and temperature of the injected fluid;

means for measuring temperature of the fluid issuing from the end opposite to the first zone of a second, adjacent zone through which the fluid flows substantially longitudinally around said element; and means for computing the temperature of said element from measurements of the flow rate and input and output temperatures of said fluid.

3. The device as claimed in claim 2 wherein said second exchange zone extending from said first zone has a smaller diameter than said first zone and is of longer length.

4. The device as claimed in claim 3 wherein said first zone is provided with a ring permitting adjustment of a positive air pressure in said zone.

5. The device as claimed in claim 4 wherein said second exchange zone extending from said first zone has a smaller diameter than said first zone and is of longer length.

* * * * *